Feb. 17, 1948. H. W. CLARKE 2,436,097
DISH
Filed March 23, 1943 3 Sheets-Sheet 1
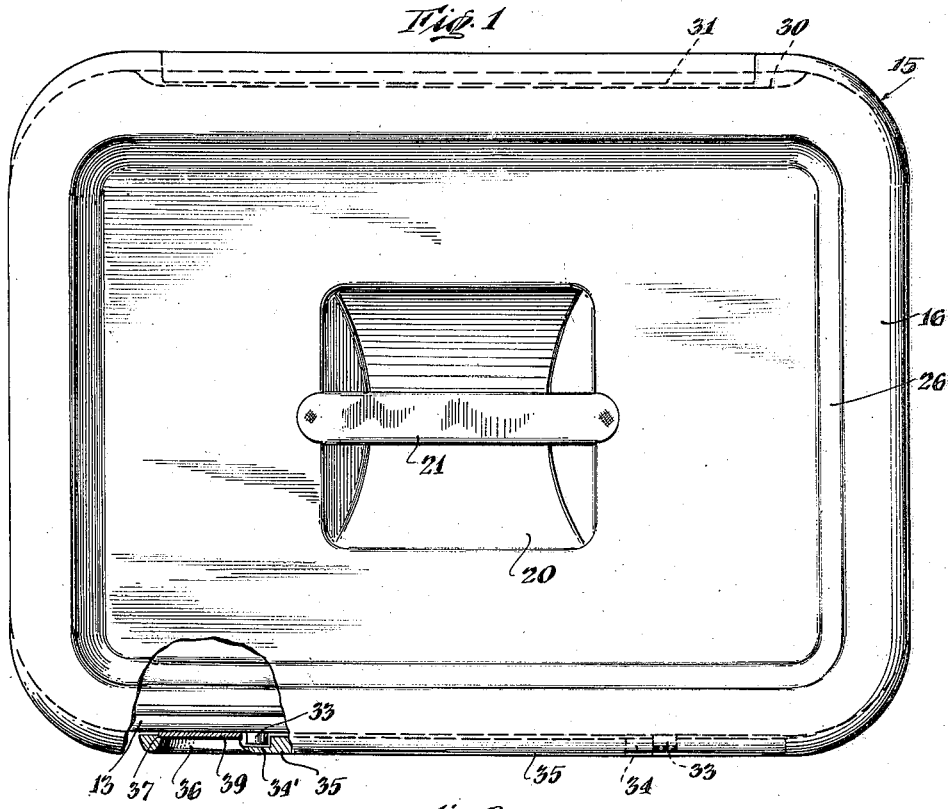
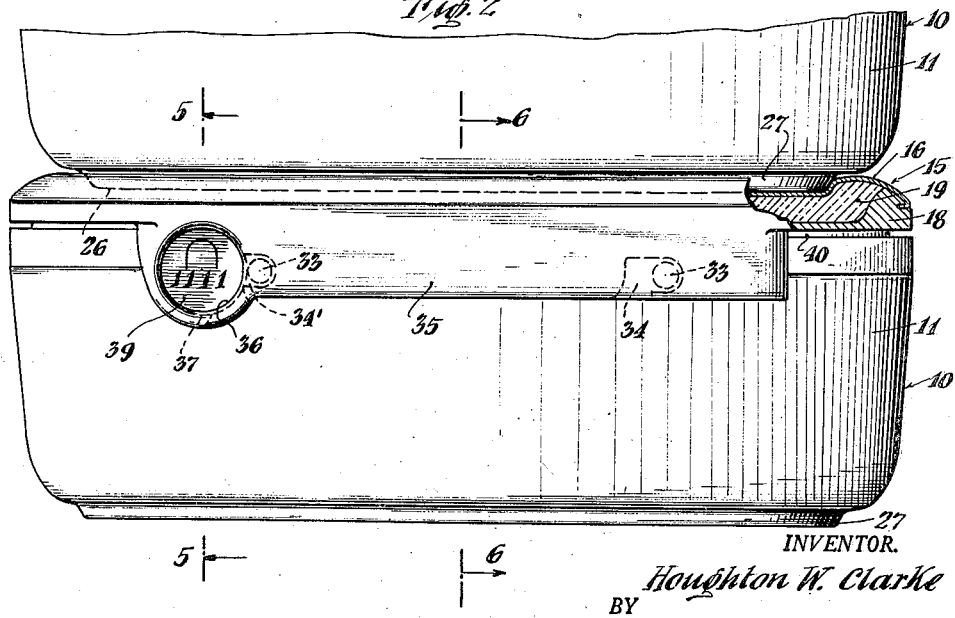
INVENTOR.
Houghton W. Clarke
BY
Blair, Curtis & Hayward
ATTORNEYS

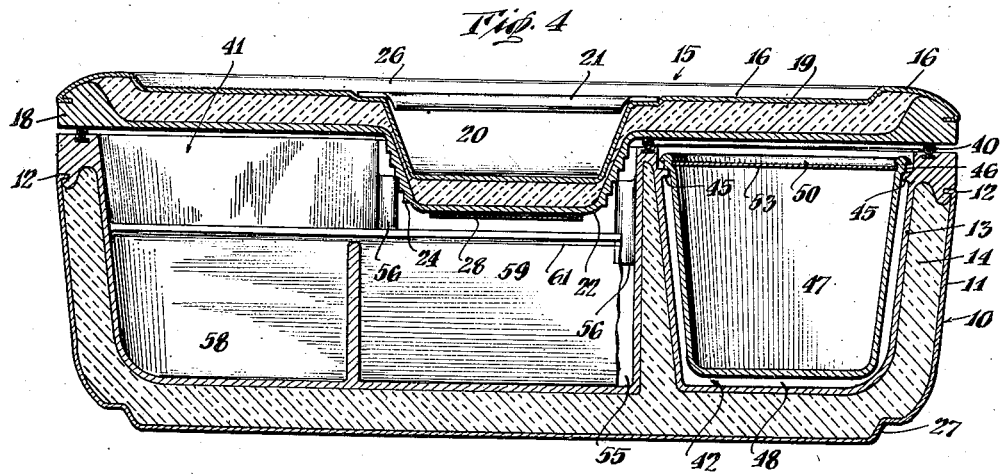
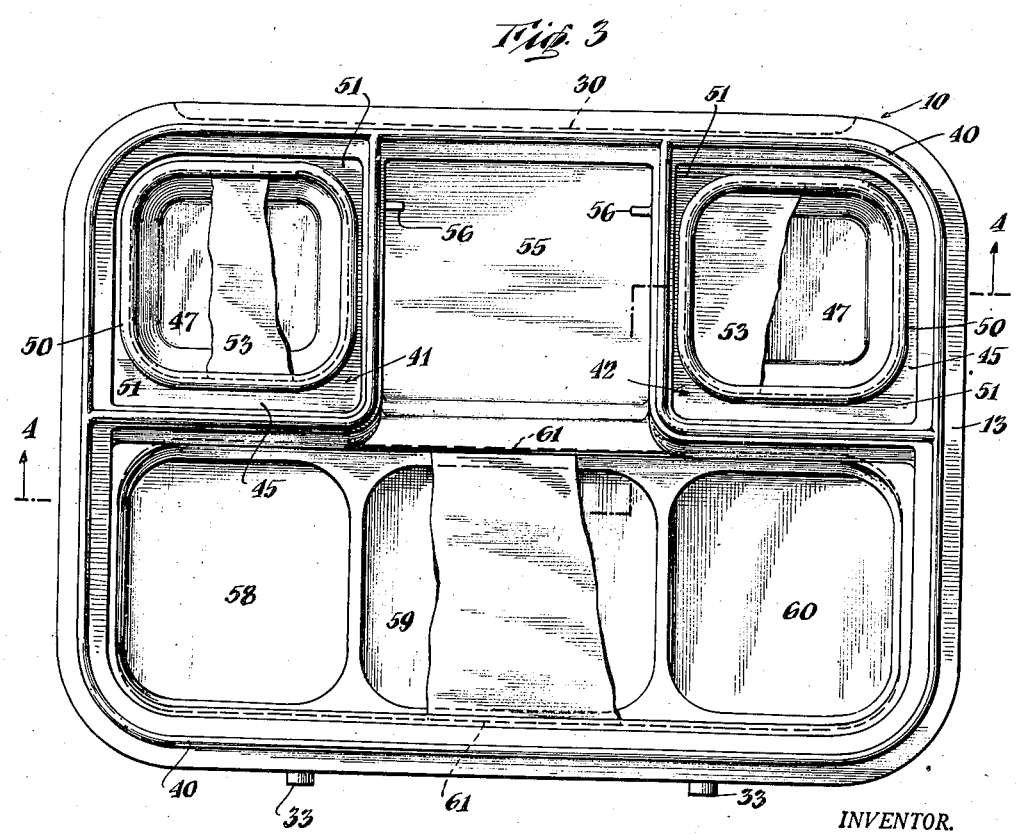

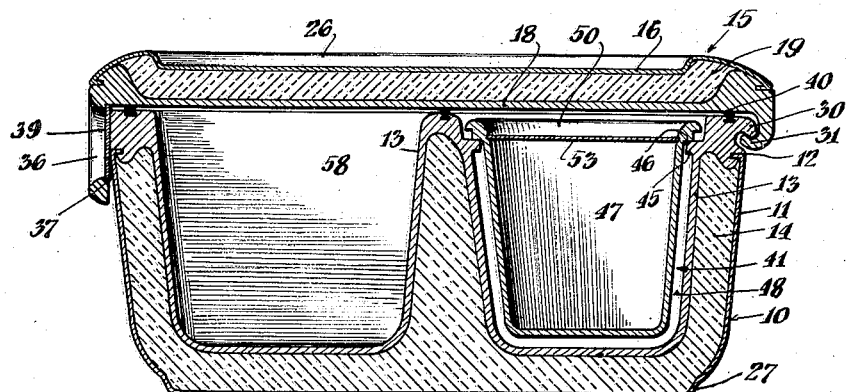

Patented Feb. 17, 1948

2,436,097

UNITED STATES PATENT OFFICE 2,436,097

DISH

Houghton W. Clarke, Bronxville, N. Y.

Application March 23, 1943, Serial No. 480,129

6 Claims. (Cl. 65—59)

This invention relates to a covered dish for serving prepared meals.

It is frequently necessary in serving meals including hot and/or chilled foods and beverages, to prepare the foods and serve them in the dishes a considerable time before they are consumed. When it is desired to provide meals for workers, particularly in mines and large plants, it has frequently been considered impracticable to serve complete meals including hot or chilled foods because of the distances which it is necessary to transport the meals before serving them to the workers.

Accordingly, it is an object of the present invention to provide a dish adapted for serving foods and/or beverages which will be capable of keeping the foods or beverages in perfect condition and without seriously objectionable change of temperature while in transport or awaiting transport to the consumer.

Another object of the invention is to provide a dish for serving meals which will be entirely hygienic and preserve foods from contamination.

Another object of the invention is to provide a dish which will be convenient for use either on a table or on one's lap.

Another object of the invention is to provide a dish adapted for ease of transport, particularly for stacking without danger of tipping or slipping from the stack.

Another object of the invention is to provide a covered dish which will show by a readily apparent indication, whether it has been opened after leaving the kitchen where it has been filled.

Another object of the invention is to provide a dish which is adapted to facilitate ordering and delivery of individual meals, and to facilitate accounting and billing the meals delivered as well as lost or broken utensils.

Other objects and advantages of the invention will be apparent from the following description and the accompanying drawings.

Although I have shown in these drawings and described in the following description, a preferred embodiment of my invention and have suggested various modifications thereof, it is to be understood that these are not intended to be exhaustive nor limiting of the invention, but on the contrary, are given for purposes of illustration in order that others skilled in the art may fully understand the invention and the principles thereof and the manner of applying the same in practical use and may be enabled to modify and adapt it in various forms, each as may be best suited to the conditions of a particular use.

Figure 1 is a top plan view with a portion broken away and shown in section;

Figure 2 is a view in front elevation of one covered dish showing a portion of another stacked on the first and with a portion broken away and shown in vertical section;

Figure 3 is a top plan view of the dish uncovered and with parts of the paper covers broken away to disclose the interiors of the food-receiving recesses;

Figure 4 is a view in vertical section of a covered dish taken along a line indicated at 4—4 in Figure 3;

Figure 5 is a vertical transverse section taken on line 5—5 of Figure 2;

Figure 6 is a view in transverse vertical section taken on line 6—6 of Figure 2; and Figure 7 is a view in front elevation and partly broken away, of an uncovered dish positioned on its own cover.

Referring to these drawings wherein I have shown a dish embodying my invention, the main body portion 10 of the dish is double-walled, in the case illustrated being formed with an exterior wall of stamped metal and an interior wall of molded plastic. In the preferred embodiment of my invention the outer wall 11 is enameled steel and is formed with an in-turned lip 12 which engages in a corresponding groove in the inner plastic member 13. Preferably, this groove is filled with a water-proof sealing compound so as to prevent any possibility of moisture leaking into the space between the walls where it might reduce the efficiency of the thermal insulation 14, in this case, a porous insulating material such as rock wool or sponge glass, etc.

The lid 15 is likewise composed of an outer wall 16, similarly made of enameled steel and similarly applied to an inner wall of plastic 18 between which is a thermal insulating space 19 which in the preferred embodiment is similarly filled with a suitable thermal insulating material. Near the center of the lid 15 is a recess 20 across which is mounted a handle 21, the opposite ends of which are spot-welded in flush relation with the lid as shown most clearly in Figure 4. A corresponding recess in the inner wall 18 forms a bulge 22 on the underside of the lid and this, as best shown in Figure 4, is formed on opposite sides with a steep slope and a surface roughened by riffling 24 or other projections or grooves so as to provide a convenient knee-hold, i. e., a portion which can be grasped between the knees of one using the dish to hold the lid securely on his lap. The upper surface of the lid and the lower surface of the body portion have inter-fitting depressions and projections, e. g., as shown at 26 and 27, whereby the covered dishes may be stacked for transportation or while awaiting transportation, and whereby the dish, after it is opened, may be conveniently used on one's lap by placing the lid in the lap and holding the bulged portion 22 between the knees and then fitting the bottom of the body portion 10 into the top of the lid by means of the inter-fitting projections and depressions 26—27, as shown in Figure 7.

In the preferred embodiment illustrated, bulged portion 22 also serves to carry an order card 28 or menu, for the following meal and to this end overhanging projections 29 are formed along the more gently sloping sides of the bulge as clearly shown in Figure 6. The menu or order card is thus prominently displayed and in a location wherein it may be readily marked without removing it from the cover.

Along one side of the dish the body 10 and the lid 15 are formed with inter-fitting hooked or grooved portions 30—31, which securely hold the lid on the body portion when it is in a closed position but which readily permits removal of the lid when it is swung upward from its closed position.

At the opposite side of the dish, the lid and body portion are provided with cooperating locking means by which the lid is held securely in position and against swinging, so as to permit release of the inter-engaging parts 30—31. In the drawings I have shown a locking means consisting of projections 33 engaged in grooves 34—34' in the apron 35 of the lid 15. Each of the grooves 34 is made similar to a bayonet slot, i. e., with an entrance portion extending to the edge and a communicating undercut portion wherein the projection 33 engages the edge of the slot to hold the lid in closed position. In one of these slots is shown a recess or hole 36 which is placed so as to extend across the bayonet slot so that the communication between the entrance and the undercut portion thereof is necessarily through this recess 36. The periphery of the recess 36 is grooved advantageously at the rear face as shown at 37, but in any case, at a distance from the front face for reception of a locking disc 39.

This locking disc 39 may advantageously be identical in structure with the paper discs commonly used for milk bottle caps, preferably having a tab partially cut therefrom so that it can be lifted with the fingernail or a knife to allow pulling of the cap out from its locking position. So long as the cap is in place it confines the projection 33 to the groove 34' and since there is no feasible way of removing the disc without at least partially destroying or defacing it, it will be readily apparent if the dish has been opened so that the contents of the dish might have been tampered with or partially removed or contaminated.

I also use this removable locking disc 33 to carry a number which identifies the customer or the customer's order on which the meal is sent out. This facilitates the handling, billing and delivery of the dish after it is sealed, and by using corresponding numbers on the order cards 28, it is likewise possible to identify each order when it is returned with the empty dish.

Between the under surface of the lid and upper rim of the body portion I have provided a sealing gasket 40 which may be secured to either the lid or the body portion as is convenient, or could even be separate. As shown in Figure 3, this gasket extends completely around the periphery of the dish in order to seal it against contamination from the outside, and also extends around each of the recesses or compartments 41 and 42 in the rear corners of the dish whereby each of these compartments is sealed when the lid is in place and thus hot or chilled beverages or frozen desserts, etc., placed in these compartments will not tend to distill vapors to or from other compartments having cooler or hotter foods.

The partitions surrounding the compartments 41 and 42 as indicated in Figures 4 and 5 are approximately the same height as the periphery walls of the body portion of the dish and are formed by an upward fold of the material of which the inner wall 13 is formed. As indicated, the thermal insulation extends into this fold so as to afford complete insulation on all sides of the compartments 41 and 42.

Near the upper rim of the compartments 41 and 42 is provided an inwardly projecting lip 45 which makes a substantially tight fit with the shoulder 46 on the cup 47 so that when the cup is in place, a closed air space 48 is provided between the cup and the wall 13. This air space 48 increases the thermal insulation and particularly if the outer surface of the cup and the inner surface of the wall 13 are polished or otherwise given a thermally reflecting nature. Such thermal reflecting surface may be advantageously provided, for example, by facing the inner wall 13 with a metal foil adhesively secured to the plastic, e. g., by placing the foil over the mold when the wall 13 is formed.

A portion of the cup as indicated at 50, is left projecting above the rim 45 and at least at opposite corners a shelf or recess 51 is provided so the fingers can be conveniently inserted underneath the rim 50 for lifting the cup from its recess.

Advantageously the cup 47 is itself sealed by a snap-in disposable paper lid 53.

Between the compartments 41 and 42 is a compartment 55 designed to receive bread, pie, fruit or other miscellaneous items of the meal, and near the rear wall I have provided projections 56 behind which the paper covers used to seal the several compartments may be stacked when they are removed from the compartments by the consumer.

At the front of the dish are a plurality of recesses or compartments 58, 59, and 60 designed to hold the main course and items of the meal. These recesses are shallower than the recesses 41 and 42 but are similarly separated by folded portions of the inner wall 13 which form double walled insulating partitions. Approximately at the level of the top of these lower partitions I have provided a peripheral groove 61 into which a paper cover may be snapped in order to seal the several compartments and also to provide a shelf below the level of the lid on which may be placed napkins, knives, forks, spoons and other miscellaneous items or accessories which it is deired to include with the meal. As shown, the groove 61 is at a level just above the level of the partitions between the compartments 58, 59, and 60 so that a single paper cover can be snapped into place covering all of these compartments. When this is done I prefer to have the cover scored transversely so as to divide it approximately into thirds whereby it can be folded and inserted behind the projections 56 when it is removed. Instead of this, I may use separate covers for each of the compartments 58, 59 and 60 and provide a groove 61 in each of the compartments 58, 59 and 60 at a level just below the top of the intervening partitions.

As an example of the use of the dish described above, orders returned with the dish from the previous meal on the cards 28 are furnished to the kitchen management and from these the complete requirements for the next meal can be determined. The meal is then prepared and served into the several recesses of the dish according to the order card for each dish. Plain napkins, utensils and any other standard items of the meal are then added, the paper covers for the several recesses are put in place and finally the lid is put into position and locked by the disc 39 bearing the symbol identifying the particular order. As each dish is filled and closed, it can be stacked on the next on suitable trucks and meals thus prepared may be held for a substantial period until all meals for a given location have been packed and stacked on the truck whereupon they may be delivered and will be received in condition that is assured by the fact that the dish is covered and sealed and thoroughly insulated against heat losses.

When the consumer receives the dish, he removes the disc 39 just as he would pull out the cap from a milk bottle, the lid 15 is then moved laterally to release the projections 33 from the bayonet slots 34 and it is then swung upward to release the projections 30—31 and removed from the top of the dish. If the consumer is to use the dish on a table the lid will be laid aside, but if the meal is to be eaten from his lap the lid will be placed on his lap with the bulged portion 28 between his knees whereby it will be held against slipping out of place and the body portion is then fitted on to the top of the lid. Paper covers, if used, are then removed and stacked behind the projections 56 after which the meal may be eaten in comfort.

The consumer will check on the menu card 28 his order for the following meal and when the dish reaches the kitchen again these menu cards will be removed and sent to the office before the dishes are cleaned for re-use. At the same time the utensils sent with the meal may be checked and in case of breakage or loss may be charged against the customer.

What I claim is:

1. A dish for serving prepared meals which comprises a body portion having a food-receiving recess therein, a lid for said dish removable therefrom wherein one edge of the lid and the corresponding edge of said body portion are formed with interlocking projection and groove members, whereby lid and body portion may be readily engaged and disengaged, and the opposite edges of the lid and body portion are provided with interengaging slot and projection, the member having such slot being provided with a recess adjacent the open end of said slot whereby the projection must pass into and through said recess when it is removed from said slot the peripheral wall of said recess being grooved to receive a resilient disc, and a disc snapped into said groove having no means for pulling it out intact, but readily destructible, whereby it can be removed after at least partial destruction thereof.

2. A dish for serving prepared meals which comprises a body portion having a food-receiving recess therein for receiving at least a portion of a meal, a lid therefor, one edge of the lid and the corresponding edge of the body portion being provided with interengaging locking means operable to release said lid only by movement of one part thereof into a recess adjacent the locked position of said part, said recess being open to, and visible from, outside the covered dish and the periphery thereof being formed with a shallow groove to engage a disc, and a disc of easily destructible material bearing an identifying symbol engaged in said groove and adapted to be removed therefrom only by impairment in some degree of the disc.

3. A dish for serving prepared meals which comprises a body portion having a food-receiving recess therein for receiving at least a portion of a meal, a lid therefor, one edge of the lid and the corresponding edge of the body portion being provided with interengaging locking means operable to release said lid only by movement of one part thereof into a recess adjacent the locked position of said part, said recess being open to, and visible from, outside the covered dish and the periphery thereof being formed with a shallow groove to engage a disc, and a paper disc adapted to fit into said recess and engage in said groove and having a tab cut but not lifted from the disc, whereby the disc can be pulled out, said disc bearing an identifying symbol.

4. A dish for serving prepared meals which comprises a body part having at least one food-receiving recess therein, a lid part for said dish removable therefrom and having the central area of its upper surface fitted to the bottom of said body part of the dish with a raised portion on one of said interfitting parts received in a corresponding recess in the other when the body part is placed on such lid part, and a projection of substantial width and height extending downward from a central portion of said lid part and having its sides roughened, whereby said lid part may be gripped between one's knees to form a table on which the body part may be held when open.

5. A dish for serving prepared meals which comprises a body portion, a lid therefor, one edge of the lid and corresponding edge of the body portion being provided with inter-engaging parts which together comprise a locking means operable to lock and to release said lid on said body portion, one of said parts being formed with a recess open to, and visible from, outside the covered dish, the recess being adapted to receive a disc of easily destructible material and to peripherally engage the edges thereof, the other of said parts including a projection positioned so as to enter a portion of said recess when said parts are lockingly engaged and so that, when the interengaging parts are operated to release said lid, said projection passes through a part of said recess which is normally occupied by said disc, whereby said disc is defaced by said projection whenever the locked dish is opened.

6. A dish for serving prepared meals which comprises a body portion having a food-receiving recess formed therein for receiving various foods and beverages of a meal, a lid therefor, one edge of the lid and the corresponding edge of the body portion being provided with interengaging locking means operable to release said lid only by movement of a projecting part thereof into a recess adjacent the locked position of said part, said recess being open to, and visible from, outside the covered dish and the periphery thereof being formed with a shallow groove to engage a disc, and a disc of easily destructible material bearing an identifying symbol engaged in said groove across the path of said projecting part and adapted to be visibly impaired by movement of said projecting part incident to release of the cover, and said disc being removable therefrom only by visible impairment of the disc.

HOUGHTON W. CLARKE.

REFERENCES CITED

The following references are of record in the file of this patent:

UNITED STATES PATENTS

| Number | Name | Date |
|---|---|---|
| 1,717,974 | Heinrichs | June 18, 1929 |
| 2,298,814 | Weis | Oct. 13, 1942 |
| 1,511,265 | Chilson | Oct. 14, 1924 |
| 1,776,813 | Luchs | Sept. 30, 1930 |
| 2,289,037 | Poglein | July 7, 1942 |
| 2,215,274 | Peterson | Sept. 17, 1940 |
| 1,953,585 | Brown | Apr. 3, 1934 |
| 1,300,712 | Ferdon | Apr. 15, 1919 |
| 1,123,793 | Pick | Jan. 5, 1915 |
| 696,162 | Callen | Mar. 25, 1902 |
| 2,048,695 | Hasenour | July 28, 1936 |
| 284,239 | Russell | Sept. 4, 1883 |
| 1,048,546 | Ketcham | Dec. 31, 1912 |
| 433,539 | Oetzmann | Aug. 5, 1890 |
| 2,070,905 | Justheim | Feb. 16, 1937 |
| 1,716,367 | Clayton | June 11, 1929 |
| 1,336,776 | Drinkwater | Apr. 13, 1920 |
| 966,264 | Sultzbaugh | Aug. 2, 1910 |
| 1,480,460 | Nuttall | Jan. 8, 1924 |
| 2,339,580 | Park | Jan. 18, 1944 |
| 585,099 | Helbach | June 22, 1897 |
| 2,288,895 | Fink | July 7, 1942 |
| 1,006,135 | Schleicher | Oct. 17, 1911 |
| 1,730,403 | Boland | Oct. 8, 1929 |
| 674,989 | Ritz | May 28, 1901 |
| 2,076,132 | LeRose | Apr. 6, 1937 |
| 2,096,825 | Roman | Oct. 26, 1937 |
| 2,401,038 | Barton et al. | May 28, 1946 |
| 1,953,585 | Brown | Apr. 3, 1934 |

FOREIGN PATENTS

| Number | Country | Date |
|---|---|---|
| 3,427 | Great Britain | Feb. 26, 1889 |